United States Patent [19]

Whalen

[11] Patent Number: 5,673,832
[45] Date of Patent: Oct. 7, 1997

[54] SKI CARRIER

[76] Inventor: Joseph Whalen, 51 Taft Rd., Weymouth, Mass. 02188

[21] Appl. No.: 741,689
[22] Filed: Oct. 31, 1996
[51] Int. Cl.$^6$ .................. B60R 9/00; B60R 9/055
[52] U.S. Cl. .................. 224/328; 224/309; 224/319; 224/324; 224/546; 224/917.5
[58] Field of Search .................. 224/309, 319, 224/324, 545, 546, 547, 328, 917.5, 924

[56] References Cited

U.S. PATENT DOCUMENTS 2,106,503  1/1938  Hendrick .................. 224/917.5

Primary Examiner—Henry J. Recla
Assistant Examiner—Timothy L. Maust
Attorney, Agent, or Firm—John P. McGonagle

[57] ABSTRACT

A combination cargo carrier and ski carrier mounted on the roof rack of a vehicle. The ski carrier is comprised of two sections, each section having two generally vertical legs, one of which is attached to the vehicle roof rack and the other of which is attached to the cargo carrier. The two sections are cross braced.

4 Claims, 4 Drawing Sheets

SKI CARRIER

BACKGROUND OF THE INVENTION

This invention relates to ski carriers, and in particular to a ski carrier attached to a vehicle with a roof-mounted cargo carrier.

Many automotive vehicles, such as passenger vehicles, station wagons, sports vehicles, panel trucks or hybrid thereof, have roof racks for carrying sports, recreational and business equipment. In situations where vehicle owners wish to add luggage space, cargo carriers are mounted on the roof racks. However, when a cargo carrier is mounted on a vehicle roof rack, the ability to also carry sports, recreational and business equipment, is severely limited.

The prior art has generally addressed this problem by attaching trailer hitches to the vehicle. U.S. Pat. No. 5,460,304 (Porter et al.) discloses a modular vehicle carrier system which provides a trailer supporting a cargo carrier and ski carrier.

However, for those owners not having or desiring the means for attaching trailer hitches to their vehicles, a means for simultaneously supporting a cargo carrier and ski carrier on a roof rack is required.

SUMMARY OF THE INVENTION

The present invention provides a combination cargo carrier and ski carrier mounted on the roof rack of a vehicle. The ski carrier is comprised of two sections, each section having two generally vertical legs, one of which is attached to the vehicle roof rack and the other of which is attached to the cargo carrier. The two sections are cross braced for additional stability.

This together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
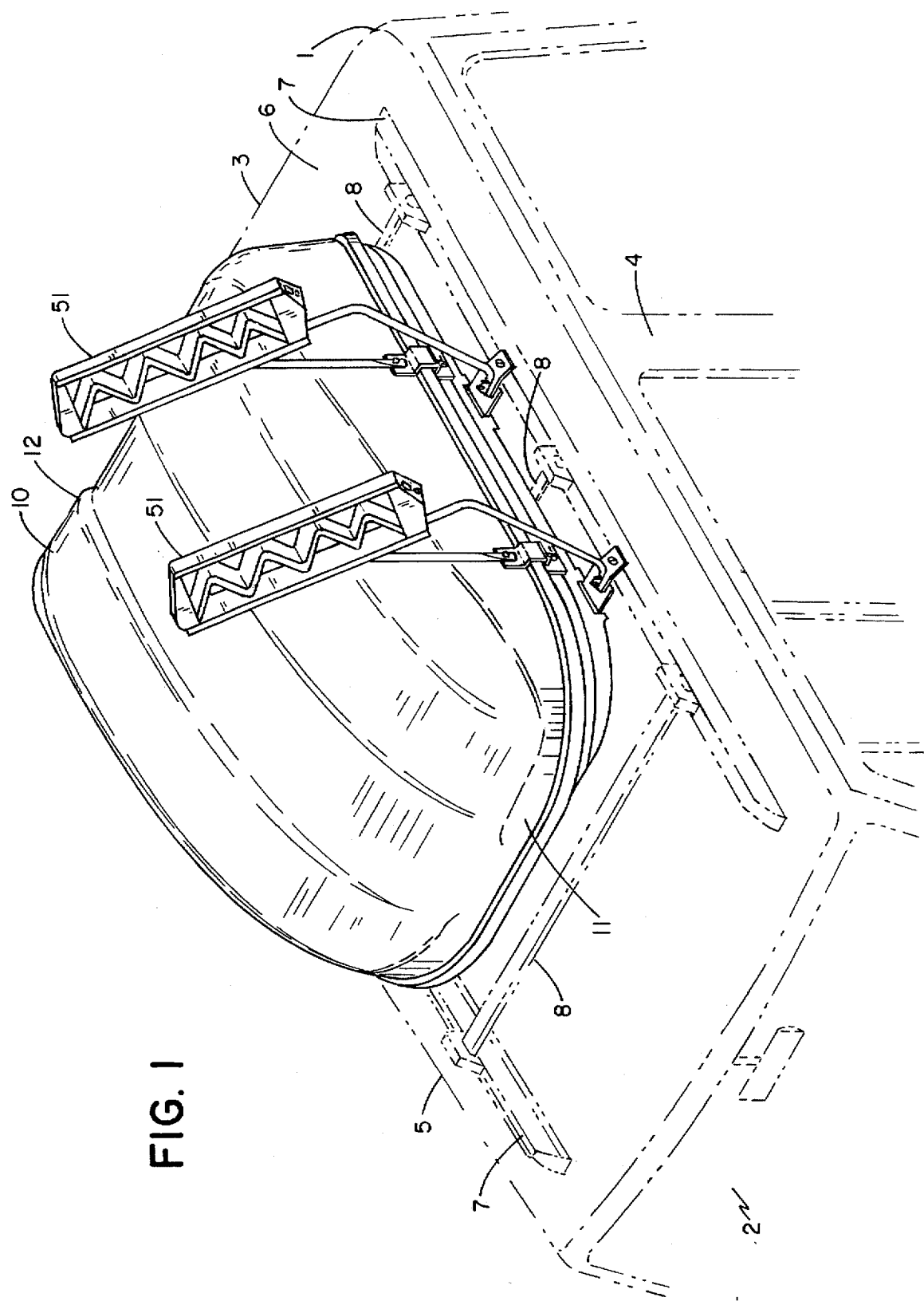
FIG. 1 is a perspective view of the invention without cross braces.
Figure 2:
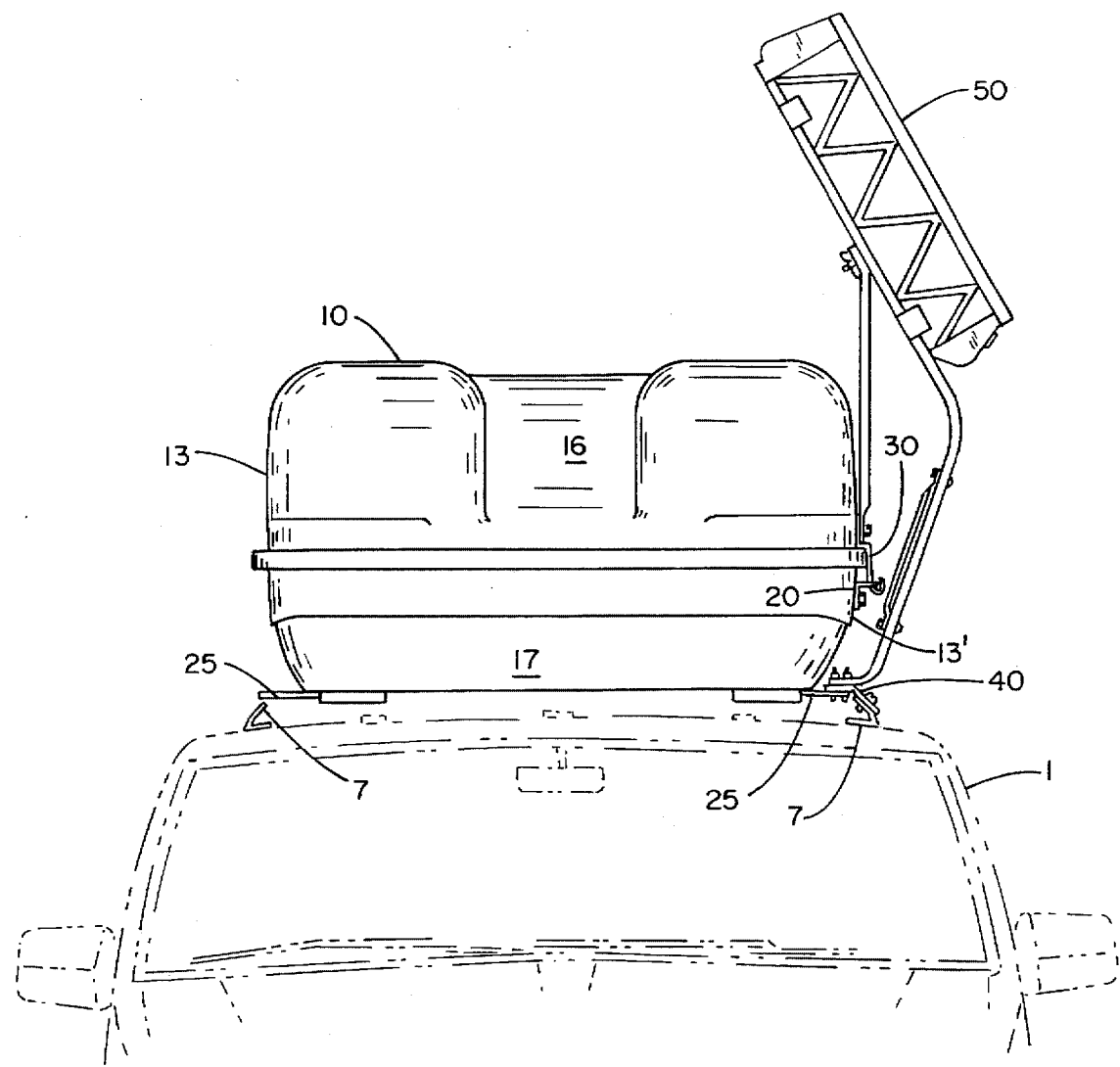
FIG. 2 is a front view thereof.
Figure 3:
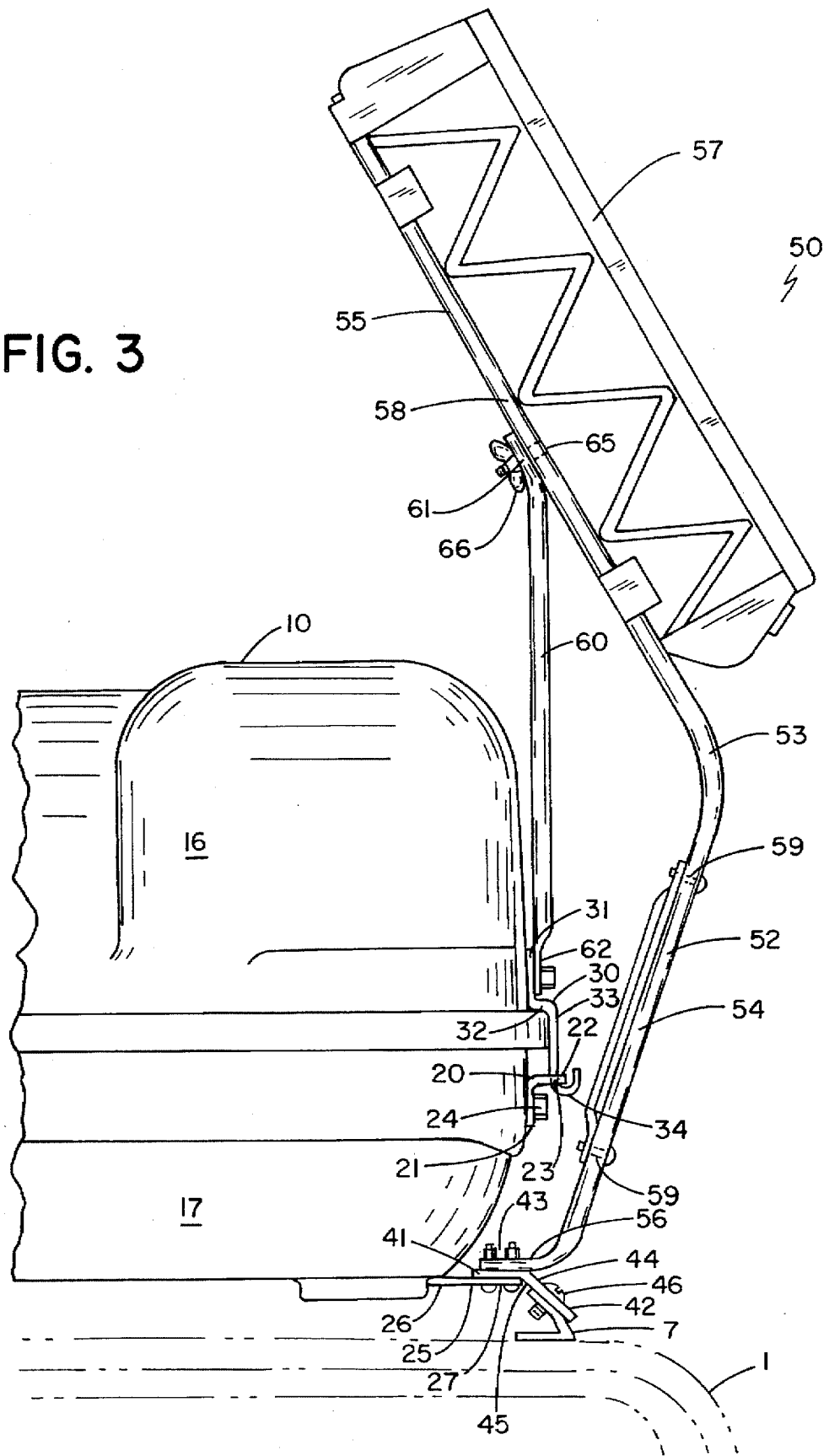
FIG. 3 is a close-up front view thereof.
Figure 4:
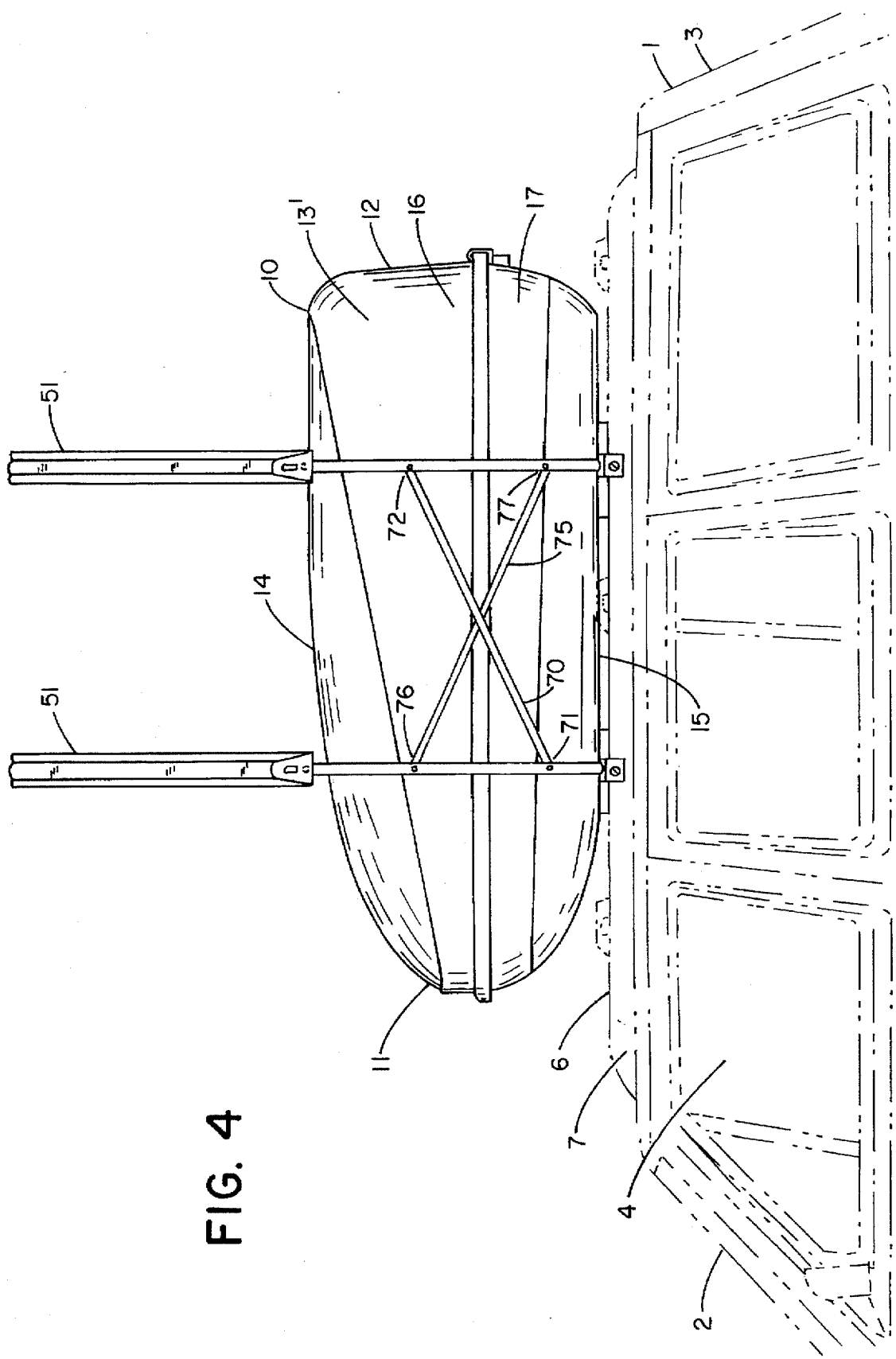
FIG. 4 is a side view thereof.

Referring to the drawings in detail wherein like elements are indicated by like numerals, there is shown a ski carrier 50 constructed according to the principles of the present invention used in combination with a cargo carrier 10 mounted on the roof of a vehicle 1. The vehicle 1 may be any type of passenger vehicle, station wagon, sports vehicle, panel truck or hybrid thereof. The vehicle 1 has a front 2, rear 3, driver side 4, passenger side 5 and a roof 6. The longitudinal axis of the vehicle 1 is defined by the vehicle front 2 and rear 3. The roof 6 has two elongated, spaced support rods 7 fixedly attached thereto, each said rod 7 having a longitudinal axis parallel to the longitudinal axis of the vehicle 1. One rod 7 is positioned near to the driver side 4 and the other rod 7' is positioned near to the passenger side 5. Two or more elongated transverse support struts 8 interconnect said rods 7, at least one strut 8 being positioned near to the vehicle front 2 and at least one strut 8' being positioned near to the vehicle rear 3. The longitudinal axis of each strut 8 is perpendicular to the longitudinal axis of the vehicle 1.

A cargo carrier 10 is positioned on the vehicle support struts 8. The cargo carrier 10 has a front 11, rear 12, two sides 13, a top 14 and a bottom 15. The cargo carrier front 11 and rear 12 define the longitudinal axis of the cargo carrier 10. The cargo carrier 10 longitudinal axis is parallel to the longitudinal axis of the vehicle 1. The cargo carrier bottom 15 rests on the support struts 8. The carrier 10 is horizontally divided into an upper half 16 and a lower half 17. In this embodiment of the invention the cargo carrier upper half 16 pivotally opens along one side 13', the side nearest the vehicle driver side 4.

The cargo carrier opening side 13' generally has two "L" shaped brackets 20 attached thereto, one toward the carrier front 11 and one toward the carrier rear 12. The brackets 20 are fixedly attached to the carrier lower half 17. Each bracket 20 has a vertical, downwardly extending, bottom portion 21 attached to a top, outwardly extending, horizontal portion 22. The top, horizontal portion 22 has a slot 23 formed therein, said slot 23 having a longitudinal axis parallel to the longitudinal axis of the carrier 10. The brackets 20 are attached to the carrier 10 by means of bolt 24 through the bracket bottom portion 21 into the side 13' of the carrier lower half 17.

The cargo carrier opening side 13' also has two flat, shaped locking brackets 30 attached thereto. The surface plane of each locking bracket 30 is parallel to the carrier 10 longitudinal axis. The locking brackets 30 each have an upper portion 31, a central portion 32 and a lower portion 33. Each locking bracket upper portion 31 lies in a vertical plane and is attached to the carrier upper half 16 directly above an "L" shaped bracket 20. The locking bracket central portion 32 juts horizontally outward from the cargo carrier side 13' and terminates in the locking bracket lower portion 33. The locking bracket lower portion 33 lies in a vertical plane, extends downwardly and terminates in an outwardly and upwardly curved hooked portion 34. The locking bracket lower portion hook portion 34 is inserted through the "L" shaped bracket top, outwardly extending, horizontal portion slot 23.

The cargo carrier bottom 15 generally has four, flat, elongated elements 25 fixedly attached thereto, two at the junction between bottom 15 and each side 13. On each side 13, the flat elements 25 are positioned vertically below the "L" shaped brackets 20. Each flat element 25 has an inner portion 26 and an outer portion 27. The flat element inner portions 26 are attached to the cargo carrier bottom 15. The flat element outer portions 27 have two parallel slots (not shown) formed therein.

Each of the two flat elements 25 on the carrier opening side 13' is attached to the nearest vehicle support rod 7 by means of a holding bracket 40. Each holding bracket 40 is comprised of an angle iron having a top surface 44 and a bottom surface 45. The angle iron 45 forms an obtuse angle, said angle iron having an inner portion 41 and an outer portion 42. The angle iron inner portion 41 is flat, horizontally positioned, and is attached to the carrier flat element outer end 27 by means of two removable fastener assemblies 43, said carrier flat element outer end 27 abutting the angle iron bottom surface 45. The holding bracket outer portion 42 angles downward over the vehicle support rod 7 and is attached thereto by means of a fastener 46.

The ski carrier 50 is comprised of two vertical sections 51 positioned along the opening side 13' of the cargo carrier 10. Each ski carrier section 51 is comprised of a generally vertical support rod 52 having a lower portion 54 and an upper portion 55 divided by an approximate support rod midpoint 53 at which the rod 52 is bent thereby causing the portions 54, 55 to form an obtuse angle. The support rod lower portion 54 terminates in a bent, flat section 56. Each lower portion 54 has two holes 59 formed therein, one hole near to the section midpoint 53 and the other hole near to the bent, flat section 56. The bent, flat section 56 occupies a horizontal plane, is oriented toward the cargo carrier 10 and rests on the holding bracket top surface 44 and inner portion 41. The fastener assembly 43 also binds the flat section 56 to the holding bracket 40. The vertical support rod upper section 55 has a hole 65 formed in its approximate midpoint and has a conventional ski-holding apparatus 57 attached thereto.

Each ski carrier section 51 is further comprised of two, generally straight, brace bars 70, 75. Each brace bar 70, 75 has a forward end 71, 76 and a rearward end 72, 77. The forward end 71 of one brace bar 70 is attached to the foremost ski carrier section support rod hole 59 nearest to its flat section 56, and the forward end 76 of the other brace bar 75 is attached to the foremost ski carrier section support rod hole 59 nearest the support bar midpoint 53. The rearward end 72 of the first brace bar 70 is attached to the rearmost ski carrier section support rod hole 59 nearest the support bar midpoint 53, and the rearward end 77 of the other brace bar 75 is attached to the rearmost ski carrier section support rod hole 59 nearest to its flat section 56.

Each ski carrier section 51 is further comprised of an elongated, straight, vertical brace rod 60 having an upper end 61 and a lower end 62. The brace rod upper end 61 is removably attached to the approximate midpoint 58 of the support rod upper portion 55 by means of a fastener 66 joining the brace rod upper end 61 to the support rod upper portion midpoint hole 65. The brace rod lower end 62 is attached to a locking bracket upper portion 31.

It is understood that the above-described embodiment is merely illustrative of the application. The height and distance of the ski holding apparatus 57 over and from the cargo carrier 10 is optional and easily changed to a desired position by adjusting the overall length of the support rods 52 and the midpoint 53 bend. Other embodiments may be readily devised by those skilled in the art which will embody the principles of the invention and fall within the spirit and scope thereof.

I claim:

1. A ski carrier in combination with a cargo carrier adapted to be mounted on a vehicle roof, said vehicle having a front, rear, driver side, passenger side and a roof, said vehicle having a longitudinal axis of the vehicle defined by the vehicle front and rear, said vehicle roof having two elongated, spaced support rods fixedly attached thereto, each said rod having a longitudinal axis parallel to the longitudinal axis of the vehicle, one said rod being positioned near to the driver side and the other said rod being positioned near to the passenger side, said vehicle having two or more elongated transverse support struts interconnecting said rods, at least one strut being positioned near to the vehicle front and at least one said strut being positioned near to the vehicle rear, each said strut having a longitudinal axis perpendicular to the longitudinal axis of the vehicle, said cargo carrier having a front, rear, two sides, a top and a bottom, said cargo carrier having a longitudinal axis defined by said cargo carrier front and rear, said cargo carrier longitudinal axis being parallel to the longitudinal axis of the vehicle, said cargo carrier bottom resting on the vehicle support struts, said cargo carrier being horizontally divided into an upper half and a lower half, said cargo carrier upper half pivotally opening along one side, said cargo carrier opening side having two "L" shaped brackets attached thereto, one toward the carrier front and one toward the carrier rear, said brackets being, fixedly attached to the carrier lower half, each said bracket having a vertical, downwardly extending, bottom portion attached to a top, outwardly extending, horizontal portion, said top, horizontal portion having a slot formed therein, said slot having a longitudinal axis parallel to the longitudinal axis of the cargo carrier, said brackets being attached to the cargo carrier by means of bolt through the bracket bottom portion into the opening side of the carrier lower half, said cargo carrier opening side also having two flat, shaped locking brackets attached thereto, each said locking bracket having a surface plane positioned parallel to the carrier longitudinal axis, said locking brackets each have an upper portion, a central portion and a lower portion, each said locking bracket upper portion lying in a vertical plane and being attached to the carrier upper half directly above an "L" shaped bracket, said locking bracket central portion jutting horizontally outward from the cargo carrier side and terminates in the locking bracket lower portion, said locking bracket lower portion lying in a vertical plane, extends downwardly and terminating in an outwardly and upwardly curved hooked portion, said locking bracket lower portion hook portion being inserted through the "L" shaped bracket top, outwardly extending, horizontal portion slot, said cargo carrier bottom having four, flat, elongated elements fixedly attached thereto, two at the junction between bottom and each side, said flat elements being positioned vertically below the "L" shaped brackets on each cargo carrier side, each said flat element having an inner portion and an outer portion, said flat element inner portions being attached to the cargo carrier bottom, said flat element outer portions having two parallel slots formed therein, each of the said two flat elements on the carrier opening side being attached to the nearest vehicle support rod by means of a holding bracket, each said holding bracket being comprised of an angle iron having a top surface and a bottom surface, said angle iron forming an obtuse angle, said angle iron having an inner portion and an outer portion, said angle iron inner portion being flat, horizontally positioned, and attached to the carrier flat element outer end by means of two removable fastener assemblies, said carrier flat element outer end abutting the angle iron bottom surface, said holding bracket outer portion angling downward over the vehicle support rod and being attached thereto by means of a fastener, comprising:

two sections, each section having two generally vertical legs, one of which is adapted to be attached to the vehicle roof rack and the other of which is attached to the cargo carrier, said sections being positioned along the said opening side of the cargo carrier; and two cross braces interconnecting said sections.

2. A ski carrier combination as recited in claim 1, wherein each carrier section is comprised of:

a generally vertical support rod having a lower portion and an upper portion divided by an approximate midpoint, said support rod being bent at said approximate midpoint forming an obtuse angle, said support rod lower portion terminating in a bent, flat section, said lower portion having two holes formed therein, one hole near to the support rod midpoint and the other hole near to the bent, flat section, said bent, flat section occupying a horizontal plane, and being oriented toward the cargo carrier and resting on the holding bracket top surface and inner portion, said vertical support rod upper portion having a hole formed at its approximate midpoint;

a fastener assembly binding said flat section to the said holding bracket; and a ski-holding apparatus attached to said vertical support rod upper portion.

3. A ski carrier combination as recited in claim 2, wherein said two cross braces interconnecting said sections are comprised of:

two generally straight brace bars each having a forward end and a rearward end, the forward end of one brace bar being attached to the foremost ski carrier section support rod hole nearest to its flat section, and the forward end of the other brace bar being attached to the foremost ski carrier section support rod hole nearest the support bar midpoint, the rearward end of the first brace bar being attached to the rearmost ski carrier section support rod hole nearest the support bar midpoint, and the rearward end of the other brace bar being attached to the rearmost ski carrier section support rod hole nearest to its flat section.

4. A ski carrier combination as recited in claim 3, wherein each carrier section is further comprised of:

an elongated, straight, vertical brace rod having an upper end and a lower end, said brace rod upper end being removably attached to the hole at the approximate midpoint of the support rod upper portion, said brace rod lower end being attached to a locking bracket upper portion.

* * * * *